(12) United States Patent
Holloway

(10) Patent No.: US 11,214,343 B2
(45) Date of Patent: Jan. 4, 2022

(54) AUTONOMOUS UNDERWATER VEHICLE

(71) Applicant: Autonomous Robotics Limited, Warminster (GB)

(72) Inventor: Arran Holloway, Warminster (GB)

(73) Assignee: AUTONOMOUS ROBOTICS LIMITED, Wiltshire (GB)

(*) Notice: Subject to any disclaimer, the term of this patent is extended or adjusted under 35 U.S.C. 154(b) by 0 days.

(21) Appl. No.: 16/467,877

(22) PCT Filed: Dec. 12, 2017

(86) PCT No.: PCT/GB2017/053723
§ 371 (c)(1),
(2) Date: Jun. 7, 2019

(87) PCT Pub. No.: WO2018/109462
PCT Pub. Date: Jun. 21, 2018

(65) Prior Publication Data
US 2020/0070942 A1  Mar. 5, 2020

(30) Foreign Application Priority Data

Dec. 16, 2016 (GB) ...................... 1621483

(51) Int. Cl.
*B63G 8/00* (2006.01)
(52) U.S. Cl.
CPC ........ *B63G 8/001* (2013.01); *B63G 2008/004* (2013.01)
(58) Field of Classification Search
CPC .................... B63G 8/001; B63G 2008/004
See application file for complete search history.

(56) References Cited

U.S. PATENT DOCUMENTS

| 5,551,364 | A | * | 9/1996 | Cipolla | ................. B63G 8/001 114/144 R |
| 5,661,259 | A | * | 8/1997 | Cipolla | ..................... B63B 1/28 114/144 R |
| 6,531,788 | B2 | * | 3/2003 | Robson | ................. F03B 17/061 290/43 |
| 7,059,566 | B2 | * | 6/2006 | Byers | ...................... B64D 5/00 244/119 |
| 7,540,255 | B2 | | 2/2009 | Hawkes | |

(Continued)

FOREIGN PATENT DOCUMENTS

DE      1118635       11/1961
JP   H02 216 389 A    8/1990

(Continued)

OTHER PUBLICATIONS

Mar. 9, 2018 International Search Report for PCT/GB2017/053723.

(Continued)

*Primary Examiner* — Lars A Olson
*Assistant Examiner* — Jovon E Hayes
(74) *Attorney, Agent, or Firm* — Hahn Loeser & Parks LLP

(57) ABSTRACT

An autonomous underwater vehicle (AUV) for sensing at a seabed is provided. The AUV is configured to be grounded in a stationary condition on the seabed. The AUV comprises a body (100), a sensing module configured to acquire data when the vehicle is grounded on the seabed, and a multiplane wing configuration (200) extending from the body. The multiplane wing may be a box wing.

18 Claims, 6 Drawing Sheets

(56) References Cited

U.S. PATENT DOCUMENTS

| | | | | |
|---|---|---|---|---|
| 7,631,611 | B1* | 12/2009 | Dick | B63G 3/02 |
| | | | | 114/312 |
| 8,876,057 | B2* | 11/2014 | Alber | B64C 39/024 |
| | | | | 244/137.1 |
| 9,096,106 | B2* | 8/2015 | Hanson | B60F 5/00 |
| 9,321,531 | B1* | 4/2016 | Takayama | B64C 39/024 |
| 10,081,416 | B2* | 9/2018 | Elder | B63G 8/14 |
| 10,155,584 | B2* | 12/2018 | Wang | B64C 27/54 |
| 2004/0229531 | A1* | 11/2004 | Driscoll | B63B 21/243 |
| | | | | 441/23 |
| 2005/0109259 | A1* | 5/2005 | August | B63G 8/001 |
| | | | | 114/312 |
| 2010/0301168 | A1* | 12/2010 | Raposo | A63H 23/00 |
| | | | | 244/171.2 |
| 2016/0124105 | A1* | 5/2016 | Valsvik | G01V 1/3852 |
| | | | | 367/15 |
| 2018/0222560 | A1* | 8/2018 | Postic | B63G 8/001 |
| 2020/0070942 | A1* | 3/2020 | Holloway | B63G 8/001 |

FOREIGN PATENT DOCUMENTS

| | | |
|---|---|---|
| WO | WO 2012/085590 A2 | 6/2012 |
| WO | 2016066719 | 5/2016 |

OTHER PUBLICATIONS

Mar. 9, 2018 Written Opinion of ISA for PCT/GB2017/053723.
Communication Pursuant to Article 94(3) EPC related to 17 818 221.8, dated May 14, 2021 (7pgs.).
Jun. 16, 2017 Combined Search and Examination Report for GB 16 21483.5.

\* cited by examiner

AUTONOMOUS UNDERWATER VEHICLE

The present application is a submission under 35 U.S.C. § 371 of international application no. PCT/GB2017/053723, filed 12 Dec. 2017 and published in the English language with publication no. WO 2018/109462 A1 on 21 Jun. 2018, which claims the benefit of the filing date of GB 16 21483.5, filed 16 Dec. 2016, the contents of which are incorporated herein by reference.

FIELD OF THE INVENTION

The present invention relates to an autonomous underwater vehicle for sensing at a seabed. That is, a vehicle which can be fully immersed in water.

BACKGROUND OF THE INVENTION

A known propulsion and steering mechanism for an autonomous underwater vehicle (AUV) is described in U.S. Pat. No. 7,540,255. Two propellers are independently driven by motors, while the orientation of the propellers is simultaneously controlled by a third motor.

AUVs are typically configured to move through water, such as an ocean, at and between varying depths. Such AUVs are typically significantly neutrally buoyant to allow the AUV to easily ascend or descend. To ensure the stability of an AUV, the centre of buoyancy of the AUV is typically disposed above the centre of gravity. Furthermore, it is preferable to maximise the distance between the centre of gravity and the centre of pressure generated by the AUV, and so it is known to provide an elongate AUV, in which the length of the AUV is much greater than the width, and to provide a small fin or wing in an aft position, to help provide a restorative hydrodynamic moment.

SUMMARY OF THE INVENTION

According to a first aspect of the invention, there is provided an autonomous underwater vehicle for sensing at a seabed, the vehicle being configured to be grounded in a stationary condition on the seabed, and comprising a body, a sensing module configured to acquire data when the vehicle is grounded on the seabed, and a multiplane wing configuration extending from the body.

With this arrangement it is possible to minimise the length of the autonomous underwater vehicle (AUV), to help make the AUV more compact, and help to maximise the maneuverability of the AUV.

The sensing module may be configured to couple with the seabed.

The sensing module may comprise a coupling plate configured to couple with the seabed and a sensor.

The autonomous underwater vehicle may further comprise a base of the body. The coupling plate may be at the base.

The coupling plate and multiplane wing may be configured to form a stable platform on the seabed.

The multiplane wing may comprises a starboard wing seabed coupling part proximate a starboard end of the multiplane wing, and a port wing seabed coupling part proximate a port end of the multiplane wing.

The multiplane wing may comprise an upper wing section and a lower wing section.

The lower wing section may extend from or proximate to a lower end of the body.

The upper wing section may extend from the body.

The body may extend between the upper and lower wing sections.

The multiplane wing may comprise a starboard wing side and a port wing side. The body may be defined between the starboard wing side and the port wing side.

The starboard wing side and port wing side may be spaced from each other by the body.

The body may comprise a vertical water thruster. The vertical water thruster may be disposed between the starboard wing side and the port wing side.

The starboard wing side may comprise a starboard fin extending between the upper wing section and the lower wing section. The port wing side may comprise a port fin extending between the upper wing section and the lower wing section.

The starboard and port fins may be yaw stabilisers.

The starboard fin and port fin may each extend between the leading and trailing edges of the multiplane wing.

The starboard and port fins may extend substantially perpendicular to the upper wing section and the lower wing section.

The upper wing section may have a positive dihedral angle.

The lower wing section may have a positive dihedral angle.

The autonomous underwater vehicle may further comprise a water thruster. The water thruster may be disposed between the upper wing section and the lower wing section.

The water thruster may be surrounded by the multiplane wing.

The autonomous underwater vehicle may comprise a starboard water thruster and a port water thruster. The starboard water thruster may be disposed on an opposite side of the body to the port water thruster.

The starboard and port water thrusters may be spaced from the body.

The starboard and port water thrusters may be mounted to the body. In embodiments, the starboard and port thrusters may be mounted to the multiplane wing. For example, extending from a lower side of the multiplane wing.

The multiplane wing may be a biplane wing.

The multiplane wing may be a box wing.

The vehicle may have a maximum length L in a fore-aft direction and a maximum width W in a port-starboard direction; and wherein L/W<2.5.

The vehicle may have a maximum length L in a fore-aft direction and a maximum height H in a height direction; and wherein L/H<3.5.

The multiplane wing may have a maximum length L(w) in a fore-aft direction; and wherein L/L(w)<2.5.

The body may have a maximum width W(b) in a port-starboard direction; and wherein 0.3<W(b)/W<0.7.

The sensing module may comprise a seismic sensor.

The body may have a nose and a tail. The multiplane wing may be disposed at the tail.

The multiplane wing may extend to a rear end of the tail.

The centre of gravity of the vehicle may be forward of the centre of pressure.

The autonomous underwater vehicle may further comprise a movable mass in the body, wherein the centre of gravity is movable to a position over the multiplane wing.

The movable mass in the body may be configured to be moveable to allow both positive and negative pitch of the underwater vehicle.

The moving mass may be moved relative to the thrusters and/or a body of the underwater vehicle (AUV) in the fore-aft direction to control the pitch of the underwater vehicle.

Movement of the moving mass may be configured to determine the pitch of the underwater vehicle.

The underwater vehicle may further comprise an activator for moving the moving mass.

The underwater vehicle as a whole (that is, including any shrouds, fairings, fins, control surfaces, thrusters or other protruding parts) has a planform external profile (that is, an external profile when viewed from above) which preferably has at least a line of symmetry along a port-starboard line.

The seismic sensor may be a geophone or hydrophone.

The thrusters may be propellers, or devices which produce jets of water by another mechanism.

The body of the vehicle may have only a single nose and a single tail at opposite ends of the underwater vehicle. Alternatively it may have multiple noses and/or multiple tails.

BRIEF DESCRIPTION OF DRAWINGS

Embodiments of the invention will now be described with reference to the accompanying drawings, in which.

DETAILED DESCRIPTION OF EMBODIMENTS

Figure 1:
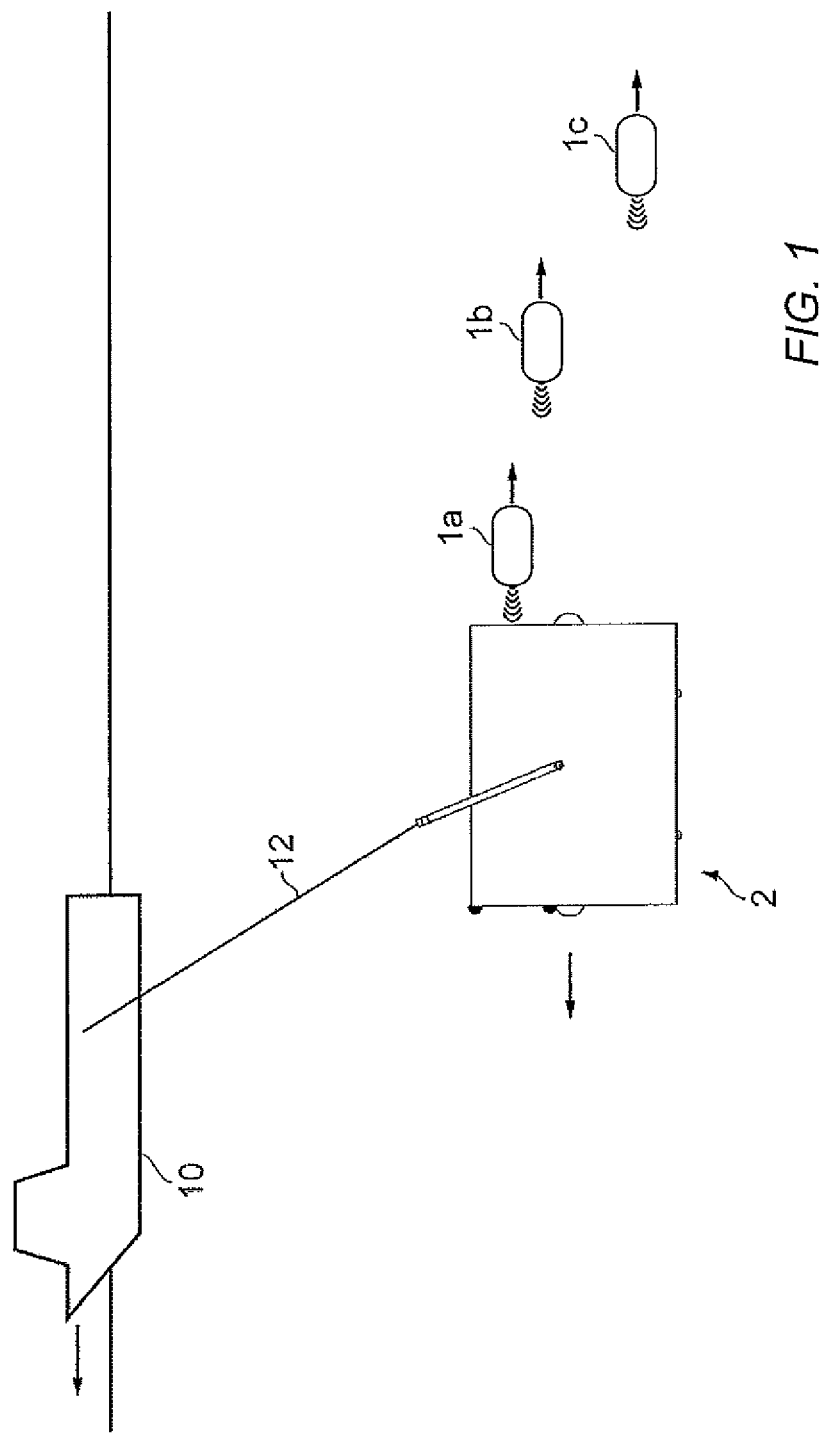
FIG. 1 shows a method of deploying autonomous underwater vehicles (AUVs)
Figure 2:
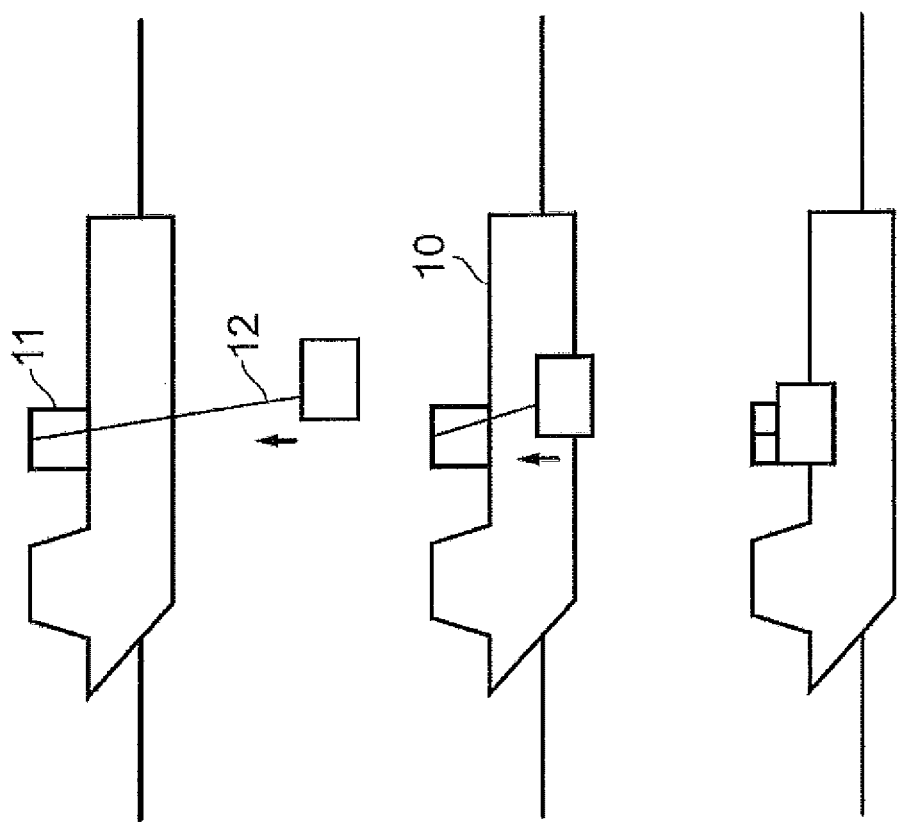
FIG. 2 shows a deployment/retrieval device being lowered into the water.

A method of deploying autonomous underwater vehicles (AUVs) 1a-c with a deployment/retrieval device 2 is shown in FIGS. 1 and 2. The device 2 is loaded with AUVs on the deck of a surface vessel 10. The device 2 carrying the AUVs is then lowered into the water by a crane 11 and an umbilical cable 12 as shown in FIG. 2 until it is at a required depth. At this point the surface vessel 10 may be stationary or it may be moving.

After the device 2 containing the AUVs has been submerged as in FIG. 2, the surface vessel 10 is driven to the left as shown in FIG. 1 so that it tows the submerged deployment device 2 containing the AUVs. The AUVs are then deployed one-by-one from the device 2 as it is towed by the surface vessel. As the surface vessel moves, the AUVs are then deployed one-by-one from the device 2. As shown in FIG. 1, a thruster of each AUV 1a-c is operated after it has been deployed so that it moves horizontally away from the towed device 2.

Figure 3:
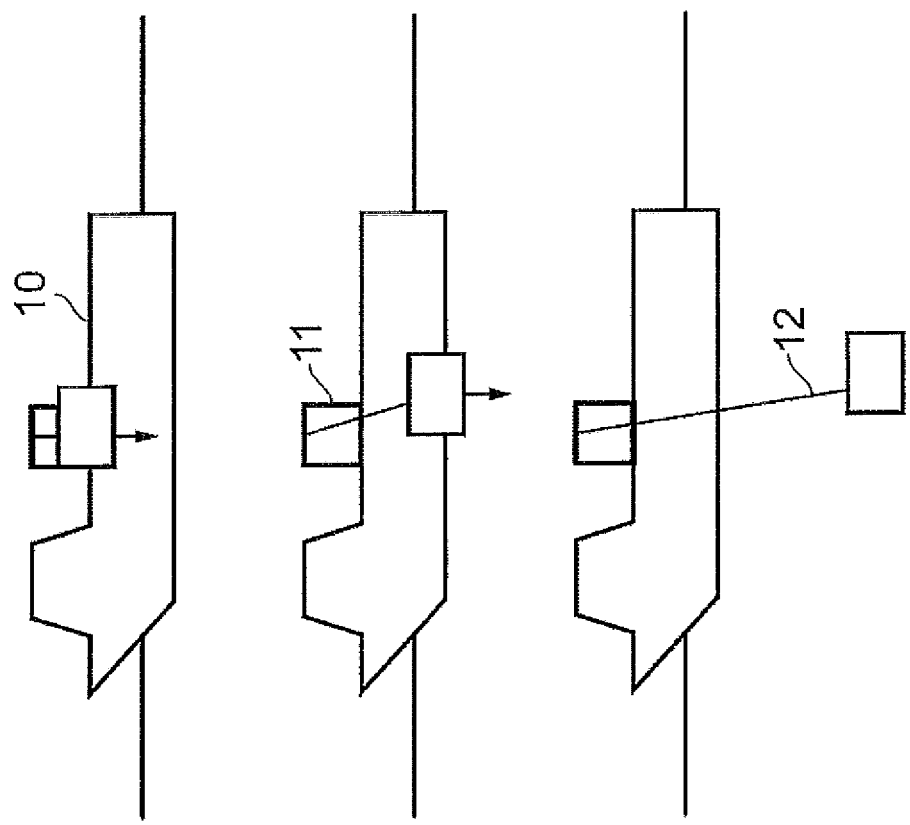
FIG. 3 shows a deployment/retrieval device being lifted from the water.
Figure 4:
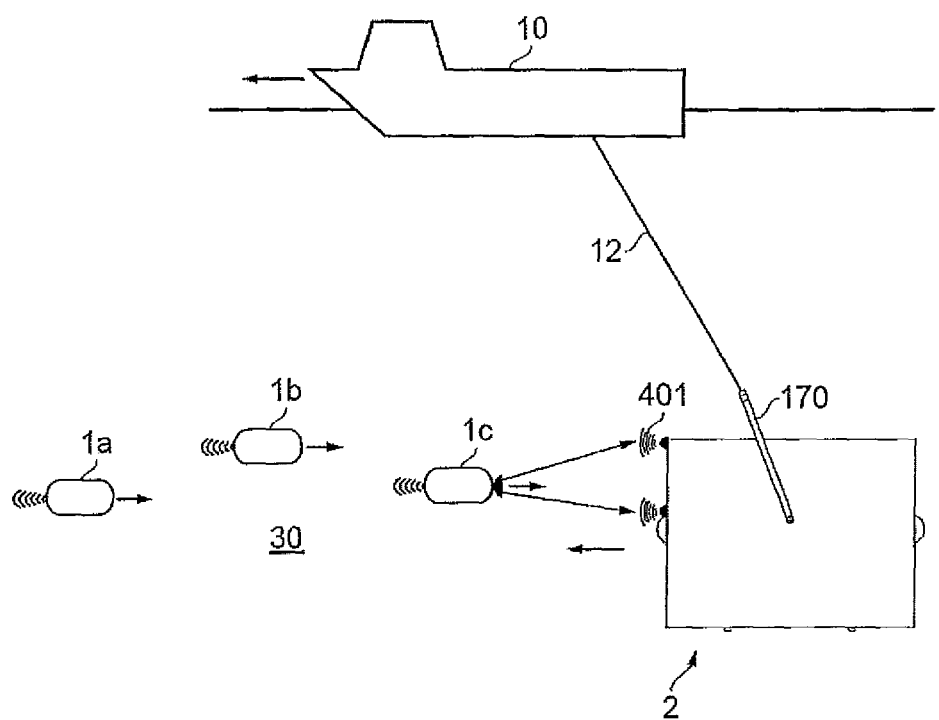
FIG. 4 shows a method of retrieving AUVs.
Figure 5:
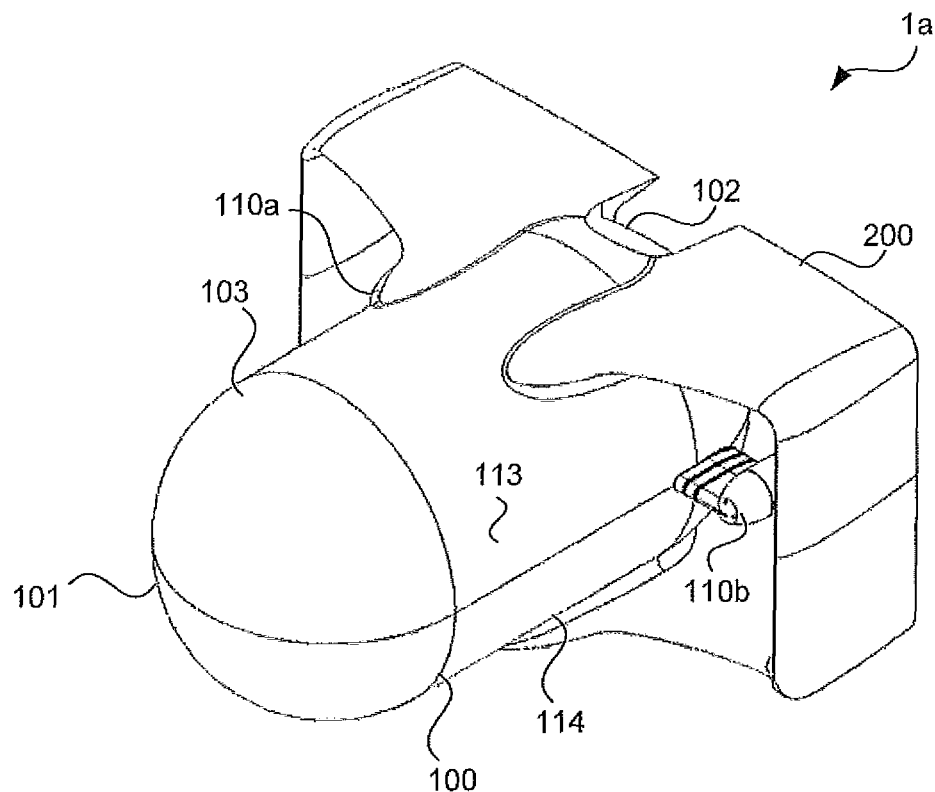
FIG. 5 is a front perspective view of an AUV.

After the AUVs have been deployed as shown in FIG. 1, they descend autonomously to the seabed, and land at precisely controlled locations where they acquire seismic data during a seismic survey. When the survey is complete, the AUVs return to the surface vessel 10 where they are retrieved by essentially the reverse process to deployment, as shown in FIGS. 3 and 4. Thrusters of the AUVs are operated so that the AUVs form a line in front of the device in a retrieval zone 30 as shown in FIG. 4. The submerged device 2 is towed through the retrieval zone 30 by the surface vessel 10, and the AUVs are loaded one-by-one into the device 2 as it is towed through the retrieval zone 30 by the surface vessel. After the AUVs have been loaded into the towed device 2, the device 2 containing a full payload of the AUVs is lifted out of the water and onto the surface vessel by the crane 11 as shown in FIG. 3.

During the deployment process, the AUV is forced out of the device 2 by the action of the water flowing through the device 2. That is—the towing motion causes a flow of water through the device 2 and this flow generates a motive force which ejects the AUV out of the device. Optionally the AUV may also operate its thrusters to assist its ejection from the device 2.

Homing devices, such as acoustic transmitters, are arranged to output homing signals 401 (such as acoustic signals) which guide the AUVs to the device during the retrieval process as shown in FIG. 4.

The AUV may optionally operate its thrusters as shown in FIG. 1 to force it into the device 2, or it may be stationary and "swallowed up" by the towed device 2.

When the device 2 is full, it is lifted up onto the deck of the surface vessel as shown in FIG. 3.

A similar process is followed during deployment. That is: the device 2 is lowered into the water with a full payload of AUVs as shown in FIG. 2; the AUVs are deployed as in FIG. 1; the empty device 2 is lifted up onto the deck of the surface vessel; AUVs are loaded onto the device 2 which is submerged and towed to deploy a further batch of AUVs.

FIGS. 5-10 show one of the AUVs 1a in detail. The AUV comprises a body 100 with a nose 101 and a tail 102 at opposite ends of the AUV. The nose 101 defines a bow of the AUV, and the tail 102 defines a stern of the AUV. The body defines a housing 103, and a cylindrical pressure vessel is defined in the body 100.

Figure 10:
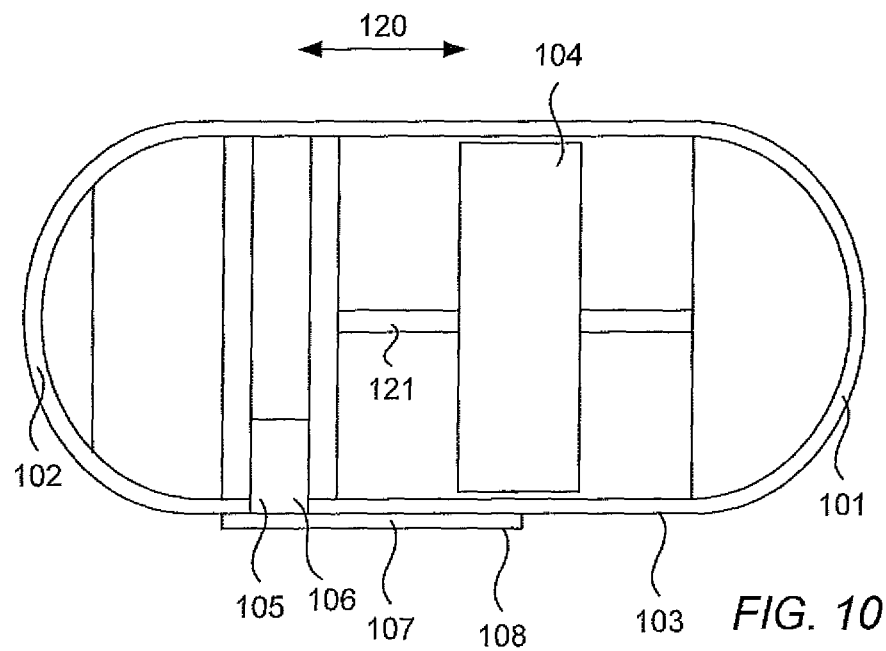
FIG. 10 is a cross-sectional view of the AUV viewed from the starboard side.

Batteries 104 are contained in the body 100 (FIG. 10).

A sensing module 105 is in the body 100. The sensing module 105 is configured to acquire data, in particular to acquire data when the vehicle is grounded on the seabed. The sensing module 105 is configured to abut against, and be positioned in a stationary position on the seabed.

The sensing module 105 is configured to be coupled with the seabed. When coupled with the seabed, the sensing module 105 is in engagement with the seabed such that it is in contact with and held in a stationary condition.

The sensing module 105 comprises a seismic sensor 106. The seismic sensor 106 is in the body 100. The seismic sensor 106 acts as a seabed sensor. That is, a seabed sensor is configured to detect one or more characteristics at the seabed when the AUV is located on the seabed, and is not limited to a seismic sensor. The seabed sensor may, for example, be a hydrophone. These may be characteristics of the seabed itself, or near the seabed, but which are taken from the seabed. Alternatively, two or more seabed sensors may be used to detect the same or different characteristics of the seabed. The seismic sensor 106 may comprise two or more seismic sensing units.

A coupling plate 107 forms part of the sensing module 105. The coupling plate 107 is disposed at a base 108 of the AUV. The plate 107 has a substantially planar downward-facing external surface which can provide a stable platform for the AUV when it is sitting on the seabed. The coupling arrangement helps to prevent movement of the AUV. Furthermore, the AUV is heavy in water, as will be explained in detail below. The AUV has a negative buoyancy at the seabed. This configuration helps to maintain the coupling of the AUV to the seabed.

Figure 7:
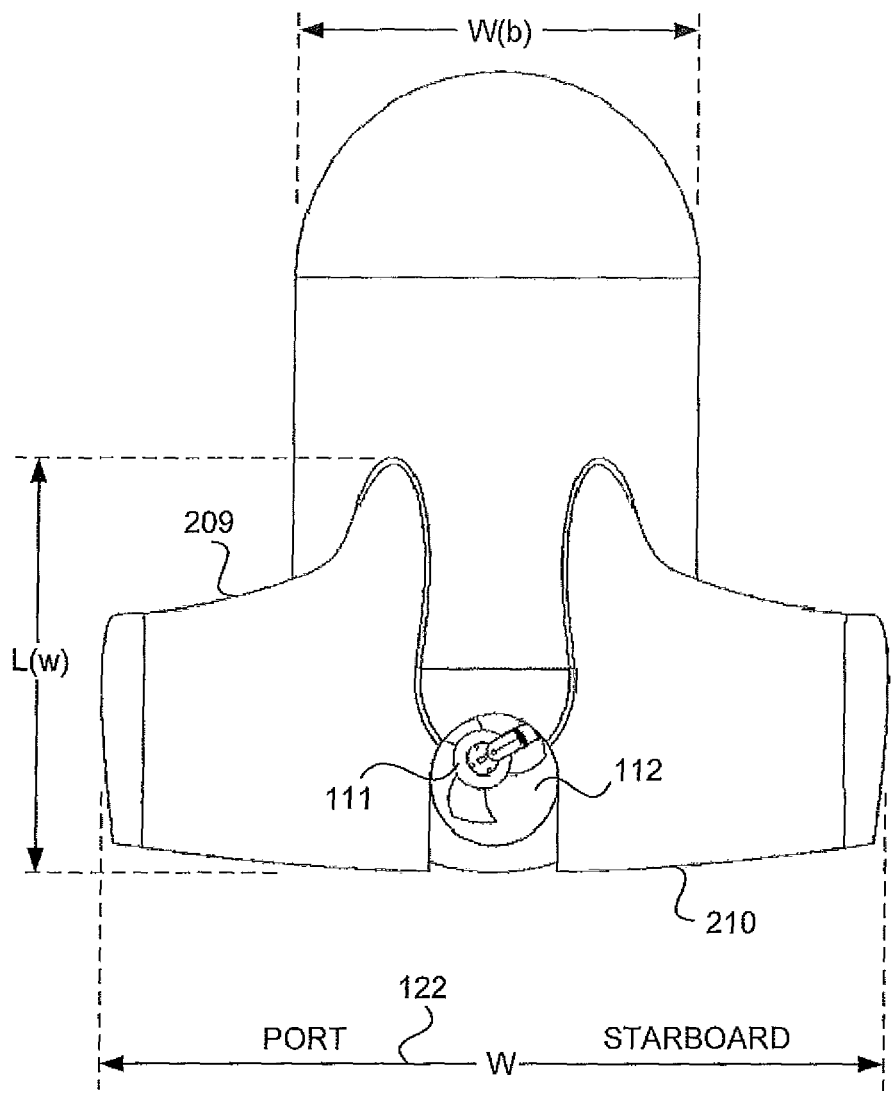
FIG. 7 is a plan view of the AUV showing its planform profile.

Starboard and port horizontal thrusters 110*a,b* (FIG. 8) are carried by the body and can be operated to propel the AUV forward and backwards. A single vertical thruster 111 is also carried by the body 100 and can be operated to control the pitch angle of the AUV and effect a vertical take-off from the seabed as will be described in further detail below. Each thruster 110*a,b*, 111 comprises a propeller. However, the thrusters may be an alternative form of propulsion, such as jet propulsion. The vertical thruster 111 is housed within a vertical duct 112 (FIG. 7). The starboard and port horizontal thrusters 110*a,b* are not received in a duct in the body 100.

The housing 103 is formed by upper and lower shells 113, 114 which meet at respective edges. The shells 113, 114 together provide a hydrodynamic hull of the AUV, including a vertical shroud which shrouds the vertical thruster 111.

The vertical duct 112 contains the vertical thruster 111 as shown in FIG. 7. The vertical duct 112 has an upper opening 115 in the upper shell 113 and an lower opening 116 in the lower shell 114 (FIG. 8), and provides a vertically oriented channel for water to flow through the vertical thruster 111 when it is generating vertical thrust. The vertical duct 112 is bounded by a wall 117 which is circular in cross-section transverse to the flow direction through the duct.

The AUV comprises a box wing 200. The box wing 200 protrudes from the body 100. The box wing 200 generates a lift force as the AUV moves forwards through the water.

The box wing 200 is a multiplane wing. That is, a multiplane wing arrangement having more than one lift surface in a stacked arrangement. As such, a monoplane arrangement is excluded, and examples of a multiplane wing include a biplane arrangement, including a box wing arrangement, or a triplane arrangement. Although in the presently described embodiment, the AUV comprises a box wing, alternative arrangements are anticipated including a biplane arrangement, a triplane arrangement and box wings with alternative profiles.

An upper wing section 201 and a lower wing section 202 together form the stacked lifting surface arrangement of the wing 200. The upper wing section 201 is spaced from the lower wing section 202. The upper wing section 201 is a fixed hydrodynamic surface. However, it will be understood that the upper wing section 201 may comprise a movable control surface. The upper wing section 201 has a dihedral shape. The dihedral shape is a positive dihedral angle.

The lower wing section 202 is a fixed hydrodynamic surface. However, it will be understood that the lower wing section 202 may comprise a movable control surface. The lower wing section 202 has a dihedral shape. The dihedral shape is a positive dihedral angle.

The wing 200 extends in a fore-aft direction 120. That is, in a direction defined between the nose 101 and tail 102 of the body 100. The nose 101 and tail 102 of the body define the nose and tail of the AUV.

The wing 200 extends proximate to the tail 102 of the body 100. The wing 200 extends to the tail of the body 100, however in embodiments may extend to a point forward of the tail 101 of the body 100, or aft of the tail of the body 100.

The upper wing section 201 protrudes from the body 100. The upper wing section 201 protrudes proximate the upper end of the body 100. The lower wing section 202 protrudes from the body 100.

The lower wing section 202 protrudes proximate the lower end of the body 100. That is, the lower wing section 202 is at the base 108 of the AUV. In embodiments, the lower wing section 202 and/or upper wing section 201 may be spaced from the body 100.

The planform profile of the upper wing section 201 conforms to the planform profile of the lower wing section 203. However, they may differ.

The wing 200 has a starboard wing seabed coupling part 203 and a port wing coupling part 204. The coupling parts 203, 204 are disposed at distal ends of the wing 200. The coupling parts 203, 204 form, together with the plate 107, a stable platform for the AUV when it is sitting on the seabed. In the present embodiment, the coupling parts 203, 204 are each a protrusion extending from the lower wing section 202.

The body 100 is midway along the wing 200. That is, the wingspan of the wing 200 extends either side of the body 100. The wing 200 has a starboard wing side 205 and a port wing side 206. The body 100 is defined between the starboard wing side 205 and the port wing side 206. In the present embodiment, the starboard wing side 205 and the port wing side 206 are spaced from each other by the body 100. The spacing of the starboard wing side 205 and the port wing side 206 provides for the vertical duct 112 to be provided without obstruction by the wing 200.

The starboard wing side 205 has a starboard fin 207. The starboard fin 207 extends between the upper wing section 201 and the lower wing section 202. The starboard fin 207 is spaced from the body 100.

The port wing side 206 has a port fin 208. The port fin 208 extends between the upper wing section 201 and the lower wing section 202. The port fin 208 is spaced from the body 100. The starboard and port fins 207, 208 are yaw stabilisers. In embodiments, the fins 207, 208 are omitted.

The AUV has its centre of gravity below its centre of buoyancy. The centre of pressure generated by the wing 200 is aft of the centre of gravity. The centre of pressure is typically 25% of the wings chord length from the leading edge of the wing 200. To ensure longitudinal stability of an AUV either the centre of pressure generated by the lift force must be behind the AUV's centre of gravity to provide a restorative hydrodynamic moment, or the restorative moment caused by the centre of buoyancy being above the centre of gravity must be greater than the de-stabilising hydrodynamic moment. The greater the separation between centre of buoyancy and centre of gravity the more stable the AUV will be.

The upper and lower wing sections 201, 202 together with the starboard and port fins 207, 208 form the box wing arrangement. The AUV as a whole (that is, including any shrouds, fairings, fins, control surfaces, thrusters or other protruding parts) has a planform external profile (that is, an external profile when viewed from above as in FIG. 7) with a line of symmetry: a fore-aft line of symmetry running between the nose 101 and the tail 102. The arrangement of the box wing aids the robustness of the AUV and helps to minimise the risk of damage in an ocean environment.

Figure 6:
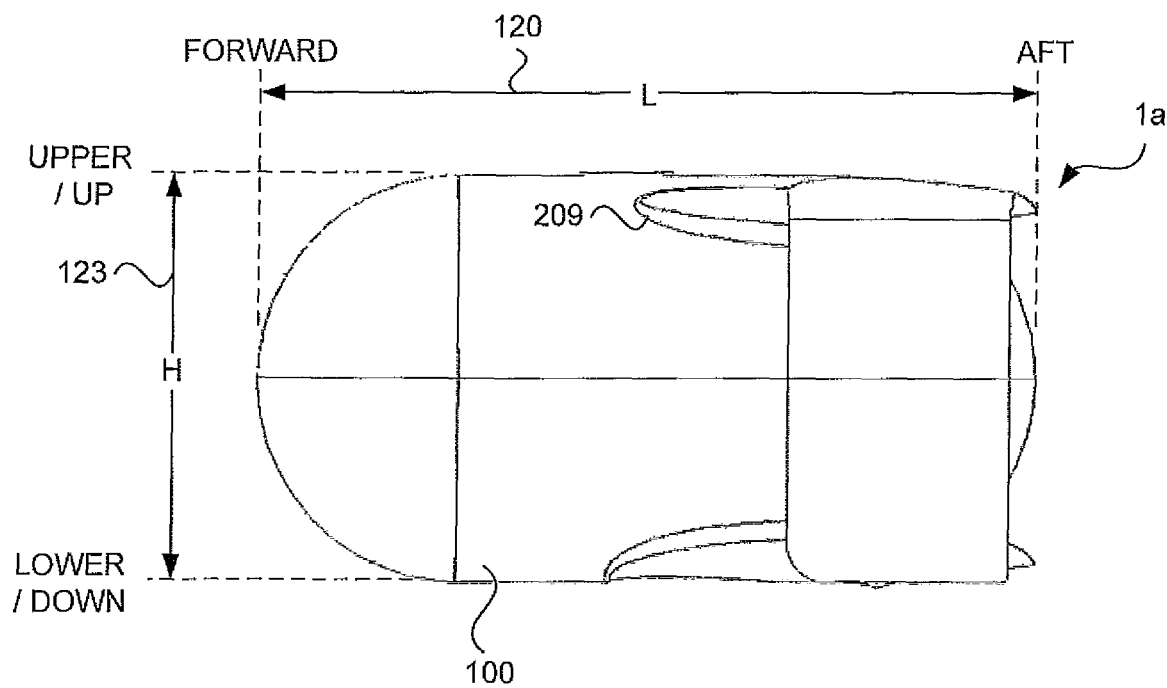
FIG. 6 is a port side view of the AUV.

As can be seen in FIGS. 6 & 7 the AUV has a maximum length L in the fore-aft direction which is approximately equal to its maximum width W in the port-starboard direction, including the wingspan of the wing 200. In other words the length-to-width aspect ratio (L/W) of the AUV is approximately one. This aspect ratio provides a number of advantages. Firstly—it enables the AUVs to be packed together efficiently when they are stored in the deployment/retrieval device 2, on the deck of the surface vessel 10, or at another storage location. Secondly—it enables the AUV to be easily rotated about a vertical axis in a confined space. It enables the AUV to rotate within the confined space of the device 2 during underwater deployment—operating its horizontal thrusters differentially to orient it in the correct direction with its nose or tail pointing out of the deployment funnel. Thirdly, when the AUV arrives at the seabed it can land in any orientation regardless of the direction of ocean currents. This can be contrasted with an AUV with a higher aspect ratio (L>>W) which would present a higher drag profile to width-wise (port-starboard) currents than to length-wise (fore-aft) currents and hence must land with its length running parallel with the ocean currents to prevent it from being disturbed by them during the seismic survey.

The wing 200 has a leading edge 210 and a trailing edge 211. The trailing edge 211 of the wing is at the tail 102 of the body 100. The leading edge 210 of the wing 200 is between the nose 101 and tail 102 of the body 100. The leading edge 210 extends to proximately midway along the length of the body 100. The length of the wing L(w)) is approximately ⅓ of the length of the total length of the AUV (L). By providing a multiwing arrangement, it has been found that the length of the AUV may be minimised whilst allowing a large lift force and maximising stability.

Figure 8:
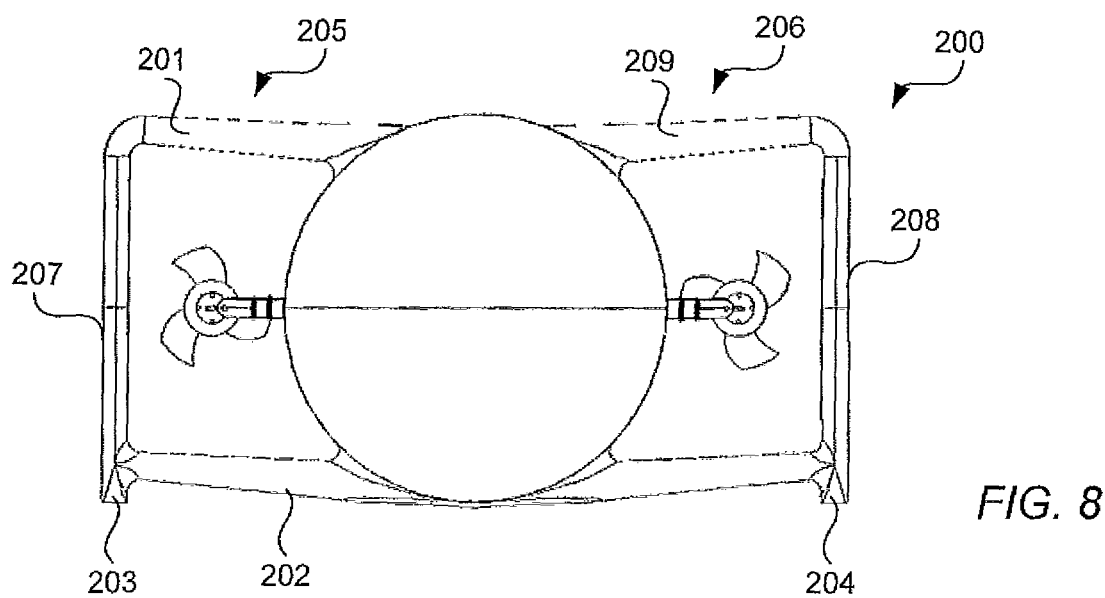
FIG. 8 is a front view of an AUV.
Figure 9:
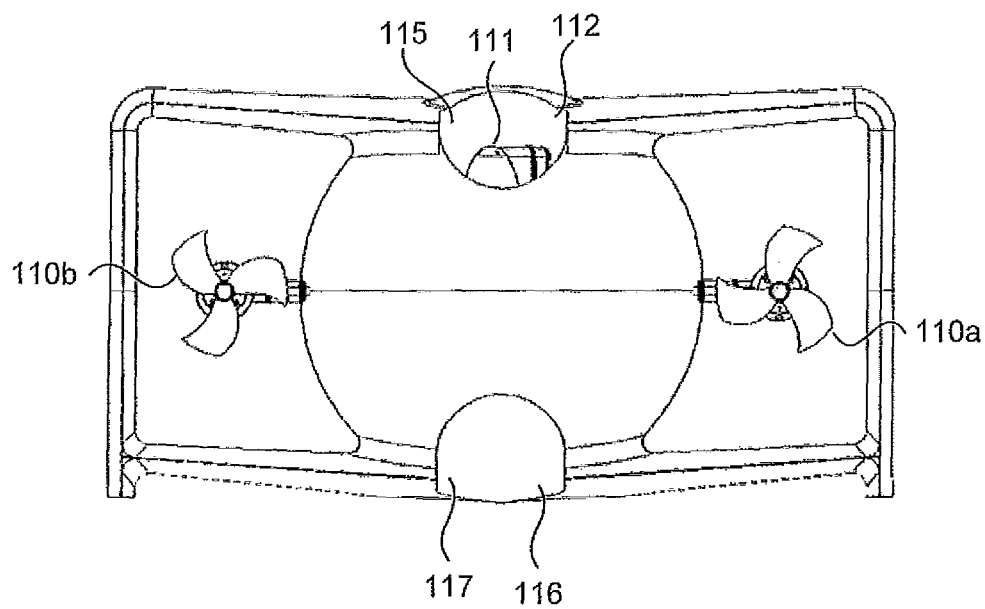
FIG. 9 is a rear view of the AUV.

The horizontal thrusters 110a,b are spaced apart in a port-starboard direction 122 shown in FIGS. 7 and 8. Each horizontal thruster is oriented to generate a thrust force in the fore-aft direction 120 perpendicular to the port-starboard direction 122. The vertical thruster 111 is oriented to generate a thrust force in a height direction 123 (FIG. 5) perpendicular to the fore-aft and port-starboard directions 120, 122.

The horizontal thrusters 110a,b are shielded by the wing 120. As such, the wing acts to protect the horizontal thrusters 110a,b from contact with external components. The horizontal thrusters 110a,b are therefore able to be contained without ducts being formed for the thrusters 110a,b to be disposed therein.

The batteries 104 can be moved relative to the rest of the AUV in the fore-aft direction 120 to control a pitch angle of the AUV. The batteries 104 slide in the fore-aft direction 120 on rails 121 shown in FIG. 10. In FIG. 10, the batteries 104 can be moved in forward and aft directions until they engage stops towards the front and rear of the housing 103 in order to adjust the angle of pitch of the AUV. The range of travel of the batteries 104 is sufficient to adjust the pitch of the AUV from nose down to nose up, that is between a negative and positive pitch angle. When the batteries are positioned fully aft as in FIG. 10 the pitch angle is with the nose 102 pointing up. By providing a multiplane wing, it is possible to maximise the hydrodynamic stability of the AUV. As such, it is possible to minimise the separation of the centre of buoyancy and the centre of gravity. This provides for the range of travel of the batteries, acting as a moving mass, to be minimised whilst maintaining a predetermined range of pitch of the AUV. Therefore, the length of the AUV may be minimised.

The batteries 104 act as a moving mass in the AUV. The position of the batteries 104 affects the position of the centre of gravity of the AUV. The batteries 104 are movable aft to move the centre of gravity of the AUV to a position over the wing 200.

The batteries 104 are moved by an actuation system comprising a motor which engages a lead screw, rotation of the motor driving the motor and the batteries 104 fore and aft.

The AUV is heavy in water. That is, the AUV is configured to have a negative buoyancy. As such, the AUV is inclined to move downwardly through the water towards the seabed. The wing 200 provides a lift force to counteract the weight of the AUV in water. By providing a heavy-in-water AUV, it is possible to stably ground the AUV on the seabed. This arrangement helps to prevent movement due to currents, and ensures that the AUV does not drift on the seabed. The heavy in water configuration of the AUV helps ensure that the AUV is capable of maintaining the same position on the seabed, and so helps to maximise the accuracy of the data collated by the sensing module 105. The configuration of the AUV as described above helps to remove the need for an anchor or other means to ensure that the AUV stably maintains its position on the seabed.

A typical mission profile for the AUV will now be described.

Following deployment the batteries 104 are positioned fully forward so the pitch angle of the AUV is negative (that is, nose down), and the horizontal thrusters generate a thrust T to drive the AUV forwards (nose first). On arriving at the seabed the AUV rests stably on the seabed. To take off the batteries 104 are moved fore and a vertical thrust T from the vertical thruster 111 causes the AUV to lift off and pitch. On ascent, the vertical thruster 111 is turned off and the horizontal thrusters generate a thrust T which drives the AUV forwards (nose first) with its nose up, that is the pitch angle of the AUV is positive.

Although the AUV is heavy in water, the lift force of the wing 200 as it moves through the water is sufficient to counteract the weight of the AUV in water. By providing a multiplane wing, such as the box wing of the present embodiment, the inventor has discovered that it is possible to minimise the length (L) of the AUV whilst maintaining stability of the AUV as it moves through the water. It has been found that the lift generated by such a multiplane wing positioned at the rear of the AUV significantly moves the net centre of pressure aft. As the body is also capable of generating lift, the multiplane wing arrangement offsets this input to the lift component of the AUV to aid stability. As such, it is possible to have a heavy in water, and compact, AUV which is configured to be grounded on the seabed, and to be stable during descent and ascent through to and from the seabed.

It has also been found that the provision of the multiplane wing is capable of offsetting the weight of the AUV to allow the AUV to rise in the water without the need for thrusters to act in a vertical direction. As such, the energy efficiency of the AUV is maximised.

Although the invention has been described above with reference to one or more preferred embodiments, it will be appreciated that various changes or modifications may be made without departing from the scope of the invention as defined in the appended claims.

The invention claimed is:

1. An autonomous underwater vehicle for sensing at a seabed, the vehicle being configured to be grounded in a stationary condition on the seabed, and comprising:
 a body comprising a base;
 a sensing module configured to acquire data when the vehicle is grounded on the seabed, and configured to couple with the seabed; and
 a multiplane wing configuration extending from the body wherein the sensing module comprises a coupling plate configured to couple with the seabed and a sensor, wherein the coupling plate is at the base of the body, and wherein the coupling plate and multiplane wing are configured to form a stable platform on the seabed.

2. The autonomous underwater vehicle according to claim 1, wherein the multiplane wing comprises an upper wing section and a lower wing section.

3. The autonomous underwater vehicle according to claim 2, wherein the multiplane wing comprises a starboard wing side and a port sing side, wherein the body is defined between the starboard wing side and the port wing side.

4. The autonomous underwater vehicle according to claim 3, wherein the starboard wing side and port wing side are spaced apart from each other by the body.

5. The autonomous underwater vehicle according to claim 4, wherein the body comprises a vertical water thruster, the vertical water thruster being disposed between the starboard wing side and the port wing side.

6. The autonomous underwater vehicle according to claim 3, wherein the starboard wing side comprises a starboard fin extending between the upper wing section and the lower wing section, and the port wing side comprises a port fin extending between the upper wing section and the lower wing section.

7. The autonomous underwater vehicle according to claim 6, wherein the starboard and port fins are yaw stabilisers.

8. The autonomous underwater vehicle according to claim 2, wherein at least one of the upper wing section and the lower wing section has a positive dihedral angle.

9. An autonomous underwater vehicle for sensing at a seabed, the vehicle being configured to be grounded in a stationary condition on the seabed, and comprising:
   a body;
   a sensing module configured to acquire data when the vehicle is grounded on the seabed;
   a multiplane wing configuration extending from the body, and comprising an upper wing section and a lower wing section; and
   a horizontal water thruster disposed between the upper wing section and the lower wing section, and surrounded by the multiplane wing.

10. The autonomous underwater vehicle according to claim 9, wherein the horizontal water thruster is a starboard water thruster and the vehicle comprises a port water thruster, wherein the starboard water thruster is disposed on an opposite side of the body to the port water thruster.

11. The autonomous underwater vehicle according to claim 10, wherein the starboard and port water thrusters are spaced from the body.

12. The autonomous underwater vehicle according to claim 1, wherein the multiplane wing is a biplane wing.

13. The autonomous underwater vehicle according to claim 1, wherein the vehicle has a maximum length L in a fore-aft direction and a maximum width W in a port-starboard direction; and wherein $L/W<2.5$.

14. The autonomous underwater vehicle according to claim 1, wherein the body has a nose and a tail, and the multiplane wing is at the tail.

15. The autonomous underwater vehicle according to claim 14, wherein the multiplane wing extends to a rear end of the tail.

16. An autonomous underwater vehicle for sensing at a seabed, the vehicle being configured to be grounded in a stationary condition on the seabed, and comprising:
   a body;
   a sensing module configured to acquire data when the vehicle is grounded on the seabed;
   a multiplane wing configuration extending from the body; and
   a movable mass in the body;
   wherein a center of gravity of the vehicle is forward of a center of pressure, and the center of gravity is movable.

17. An autonomous underwater vehicle for sensing at a seabed,
   the vehicle being configured to be grounded in a stationary condition on the seabed, and comprising
   a body;
   a sensing module configured to acquire data when the vehicle is grounded on the seabed; and
   a multiplane wing configuration extending from the body,
   wherein the vehicle has a maximum width W in a port-starboard direction, the body has a maximum width W(b) in a port-starboard direction, and $0.3<W(b)/W<0.7$.

18. The autonomous underwater vehicle according to claim 17, wherein the vehicle has a maximum length L in a fore-aft direction; and wherein $L/W<2.5$.

* * * * *